(12) United States Patent
Chiu

(10) Patent No.: US 9,347,856 B2
(45) Date of Patent: May 24, 2016

(54) KEY TESTING DEVICE

(71) Applicant: ASUSTeK COMPUTER INC., Taipei (TW)

(72) Inventor: Chien-Hsing Chiu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 414 days.

(21) Appl. No.: 13/867,124

(22) Filed: Apr. 22, 2013

(65) Prior Publication Data
US 2014/0130604 A1 May 15, 2014

(30) Foreign Application Priority Data
Nov. 14, 2012 (CN) .......................... 2012 1 0457239

(51) Int. Cl.
G01M 99/00 (2011.01)
(52) U.S. Cl.
CPC .................................... *G01M 99/008* (2013.01)
(58) Field of Classification Search
CPC .................................................. G01M 99/008
See application file for complete search history.

(56) References Cited

U.S. PATENT DOCUMENTS

| 3,030,846 A * | 4/1962 | Greenleaf ........................ 84/388 |
| 7,798,013 B2 | 9/2010 | Chiu et al. |
| 2008/0257058 A1 | 10/2008 | Chiu et al. |
| 2012/0048039 A1 | 3/2012 | Qiu et al. |

FOREIGN PATENT DOCUMENTS

| CN | 1932538 A | 3/2007 |
| TW | I272477 B | 2/2007 |

* cited by examiner

*Primary Examiner* — Paul West
(74) *Attorney, Agent, or Firm* — CKC & Partners Co., Ltd.

(57) ABSTRACT

A key testing device is for testing a key with a keycap. The key testing device includes a loading unit and a sleeve. The loading unit includes a block and a rod. The rod includes a first end and a second end. The first end is detachably connected the block. The sleeve is sleeved around the loading unit, and the sleeve includes a partition plate with a through hole. The second end can pass through the through hole. When the sleeve is above the key and the second end contacts the keycap, the gravity of the loading unit is turned from the partition plate to be applied on the keycap. Consequently, since the key testing device can make the pressure pressing on the key be accurate via a loading unit, the probability of misjudgment is decreased.

6 Claims, 10 Drawing Sheets

KEY TESTING DEVICE

CROSS-REFERENCE TO RELATED APPLICATION

This application claims the priority benefit of China application serial no. 2012104572391, filed on Nov. 14, 2012. The entirety of the above-mentioned patent application is hereby incorporated via reference herein and made a part of specification.

BACKGROUND OF THE INVENTION

1. Field of the Invention

This invention relates to a key testing device and, more particularly, to a handheld testing device which can quickly test whether the key is pressed normally.

2. Description of the Related Art

Keys of a keyboard are usually tested by machines and manual work respectively. In a first testing stage, a key testing device detects whether a switch of each key is normal (that is, whether the key can successfully output a key signal). The key testing device includes a plurality of press elements. The key testing device can activate all press elements to press the keys quickly and heavily. Since the key is previously connected to a signal recognition device, the signal recognition device determines whether the key signal of the key is correct after the press element heavily presses. After confirming each key is normal, a second testing stage is performed.

In the second testing stage, a tester presses each key of the keyboard with appropriate pressure manually to detect whether the structure of the key is normal. If the key does not output a right key signal, it represents that the structure of the key is abnormal.

However, by pressing the key manually, the values of the pressures are not constant, and the appropriate pressure is different individually. Consequently, the probability of misjudgment is increased, and the difficulty of quality management is increased.

BRIEF SUMMARY OF THE INVENTION

A key testing device is provided to test the key. The key includes a keycap. The key testing device includes a loading unit and a sleeve. The loading unit includes a block and a rod. The rod includes a first end and a second end. The first end is connected to the block detachably. The sleeve is sleeved around the loading unit and the sleeve includes a partition plate. The partition plate includes a through hole for the rod to pass through. The partition plate bears the gravity of the loading unit. When the sleeve is above the key and the second end contacts the keycap, the gravity of the loading unit is turned from the partition plate to be applied on the keycap.

The key testing device in embodiments is simple, light and thin. After the loading unit is accommodated in the sleeve, the testers can hold the sleeve easily and move the key testing device quickly to the top of the key to be tested. In other words, the sleeve of the key testing device can be used as the carrier for moving the loading unit. Moreover, when the whole gravity of the loading unit is applied on the keycap of the key, the sleeve makes the loading unit keep balanced at the keycap. Since the key testing device can make the pressure pressing on the key be accurate via a loading unit, the probability of misjudgment is decreased.

DETAILED DESCRIPTION OF THE EMBODIMENTS

Figure 1:
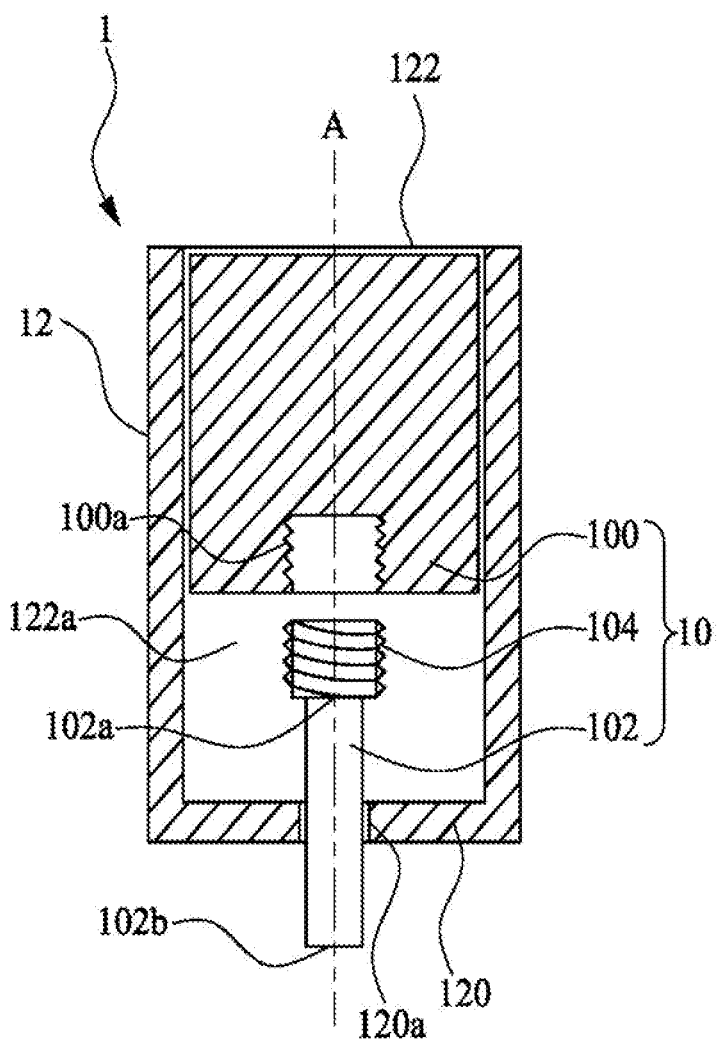
FIG. 1 is an exploded diagram showing a key testing device in a first embodiment, wherein a sleeve and a block are shown from a section.

FIG. 1 is an exploded diagram showing a key testing device 1 in a first embodiment, wherein a sleeve 12 and a block 100 are shown from sections.

Referring to FIG. 1, the key testing device 1 includes a loading unit 10 and a sleeve 12. The loading unit 10 includes a block 100 and a rod 102. The rod 102 includes a first end 102a and a second end 102b. The first end 102a is connected to the block 100 detachably. In other words, the first end 102a is the end of the rod 102 to connect one end of the block 100, and the second end 102b is the end of the rod 102 away from one end of the block 100.

The shapes of the block 100 and the rod 102 are cylindrical in the embodiment, and the diameter of the block 100 is larger than that of the rod 102, which is not limited herein.

The block 100 of the loading unit 10 is the major component of the key testing device 1 to provide pressure. When the normal setting pressure for determining whether the structure of a key 22 is changed, the tester only needs to replace the block 100 with appropriate weight according to the requirement.

The loading unit 10 of the key testing device 1 is the main structure for providing pressure (that is sum of the weight of the block 100 and the rod 102) accurately. For example, when the predetermined pressing pressure is 75 grams, the tester can select the combination of the block with 65 grams and the rod with 10 grams. When the predetermined pressing pressure is 65 grams, the tester may select the combination of the block with 55 grams and the rod with 10 grams.

The rod 102 is used to press the key, and the contact area of the rod 102 is used for simulating the touched area of the finger. When the normal setting pressing area for determining whether the structure of a key 22 is changed, the tester only needs to replace the rod 102 by one with appropriate diameter according to the requirements.

The sleeve 12 includes an opening 122 and a partition plate 120. The opening 122 and the partition plate 120 are formed at two ends of the sleeve 12 respectively. The sleeve 12 includes an axis A, and the partition plate 120 is vertical to the axis A. An accommodating space 122a is concavely formed at the sleeve 12 from the opening 122 to the partition plate 120 along the axis A. The shape of the accommodating space 122*a* is fit to the shape of the block 100, and a clearance is formed therebetween. Therefore, the accommodating space 122*a* can accommodate the loading unit 10, and the loading unit 10 can slide in the sleeve 12 along the axis A relative to the partition plate 120.

The partition plate 120 includes a through hole 120*a*. The through hole 120*a* allows the second end 102*b* of the rod 102 to pass through, and it would not allow the block 100 to pass through. The diameter of the through hole 120*a* is larger than the diameter of the rod 102 but smaller than the diameter of the block 100. When the loading unit 10 in the accommodating space 122*a* moves toward the partition plate 120, the second end 102*b* of the rod 102 passes through the sleeve 12 via the through hole 120*a*. The sleeve 12 bears the gravity of the loading unit 10 via the partition plate 120.

Figure 2A:
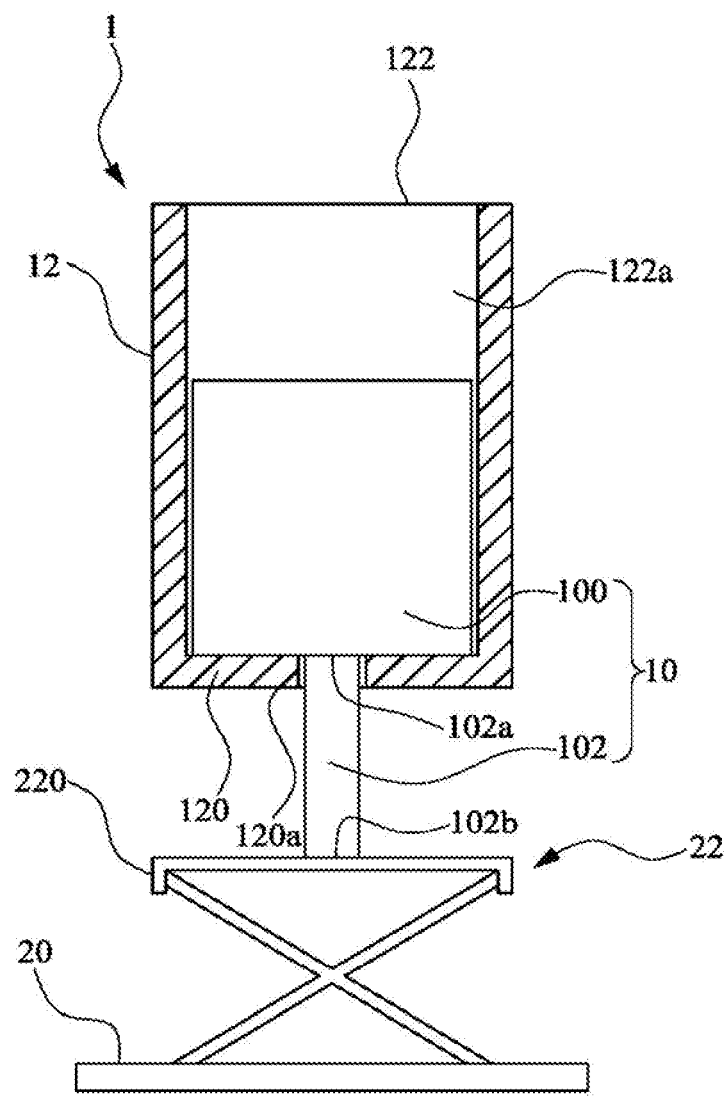
FIG. 2A is a schematic diagram showing the key testing device in FIG. 1 before testing the key, wherein the sleeve is shown from a section.
Figure 2B:
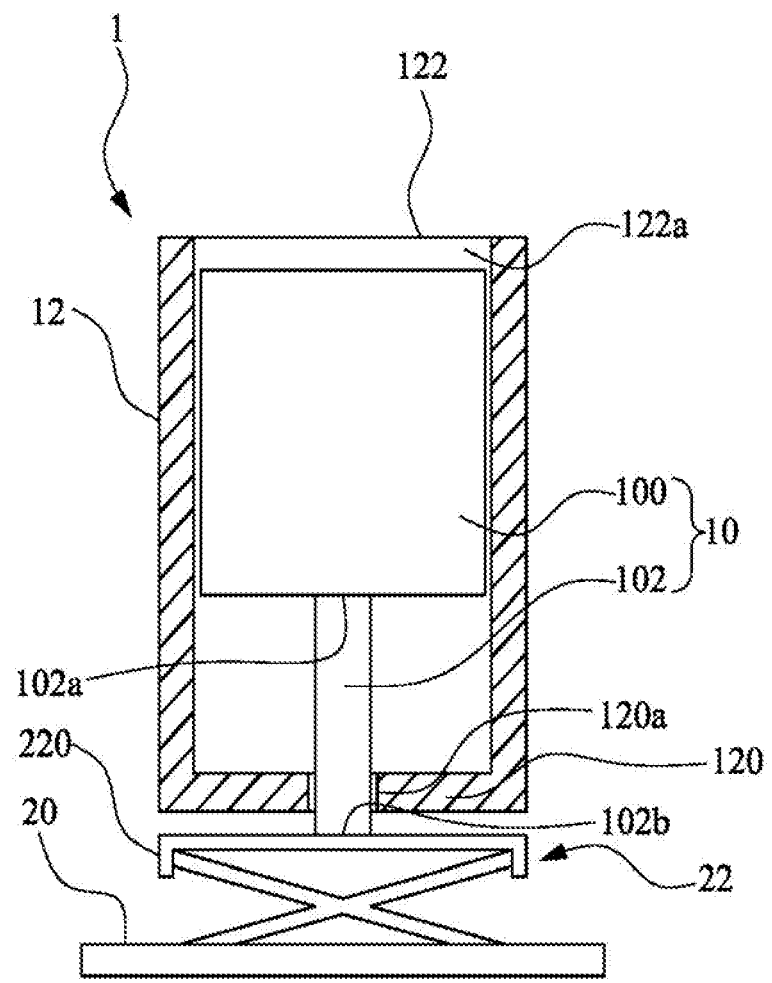
FIG. 2B is a schematic diagram showing the key testing device in FIG. 2A after testing the key.

FIG. 2A is a schematic diagram showing the key testing device 1 in FIG. 1 before testing the key, and the sleeve 12 is shown from a section. FIG. 2B is a schematic diagram showing the key testing device 1 in FIG. 1 after testing the key.

Referring to FIG. 2A, the tester can hold the sleeve 12 of the key testing device 1 easily and move the key testing device 1 quickly to the top of the key 22. The sleeve 12 of the key testing device 1 is a carrier for moving the loading unit 10. The block 100 of the loading unit 10 bears on the partition plate 120. The rod 102 passes through the through hole 120*a* of the partition plate 120, and the second end 102*b* of the rod 102 faces the keycap 220 of the key 22. In other words, the whole gravity of the loading unit 10 is applied on the partition plate 120.

Referring to FIG. 2B, when the tester holds the sleeve 12 of the key testing device 1 and moves the sleeve 12 towards the keycap 220 of the key 22, the second end 102*b* of the rod 102 contacts the keycap 220 firstly. When the sleeve 12 continues to move toward the keycap 220, the gravity of the loading unit 10 is turned from the partition plate 120 to be applied on the keycap 220 to make the keycap 220 pressed towards the baseplate 20 of the keyboard (not shown). In other words, the gravity of the loading unit 10 is applied on the keycap 220 via the second end 102*b* of the rod 102. After the gravity of the loading unit 10 is turned to be applied on the keycap 220, since the sleeve 12 can limit the position of the block 100, the loading unit 10 keeps balanced at the keycap 220, and the barycenter of the loading unit 10 is right above the keycap 220.

When the loading unit 10 presses down the keycap 220 of the key 22 with an accurate quantitative pressure (that is the gravity of the loading unit 10), if a key signal is outputted normally, the tester determines that the structure of the key 22 is normal. Conversely, when the key signal is not outputted normally, the tester determines that the structure of the key 22 is abnormal.

The first end 102*a* of the rod 102 includes a first fixing member to make the first end 102*a* of the rod 102 detachably connected with the block 100. The block 100 includes a second fixing member. The rod 102 is detachably connected with the block 100 via the locking, the fastening, or the magnetic connection between the first fixing member and the second fixing member.

Referring to FIG. 1, a locking member 104 of the key testing device is regarded as a first fixing member of the rod 102. The locking member 104 is disposed at the first end 102*a* of the rod 102. The screw hole 100*a* at the bottom of the block 100 is regarded as the second fixing member of the block 100. External threads of the locking member 104 match with internal threads of the screw hole 100*a*. The rod 102 may be disposed in the screw hole 100*a* to connect to the block 100 detachably, which is not limited herein.

Figure 3:
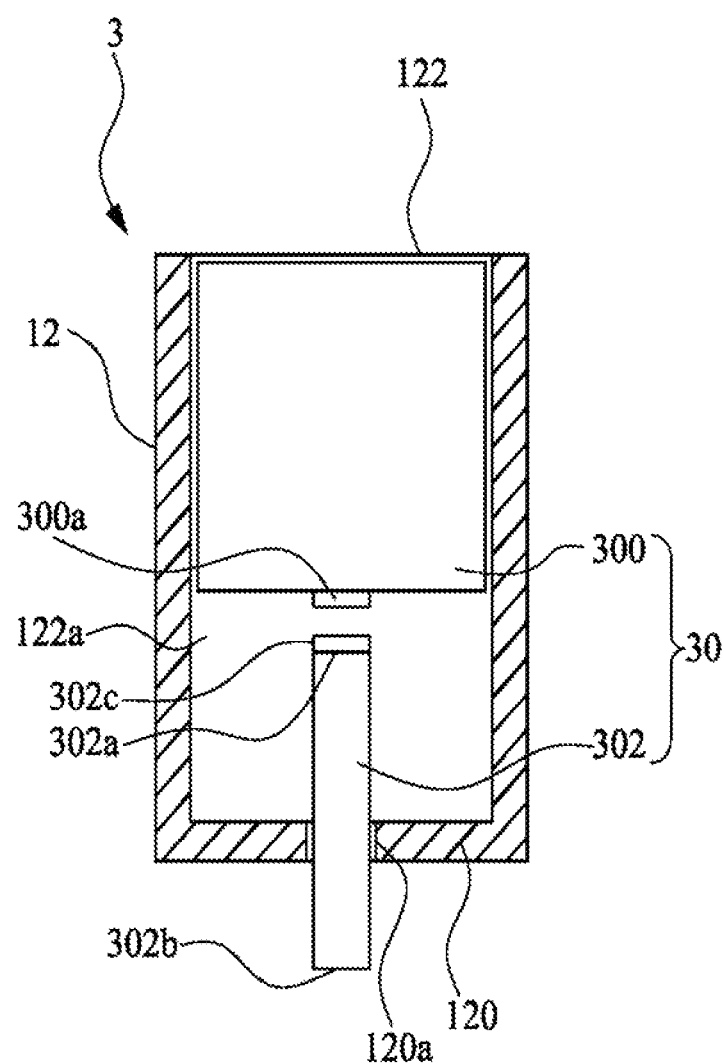
FIG. 3 is a exploded diagram showing a key testing device in a second embodiment, wherein the sleeve is shown from a section.

FIG. 3 is an exploded diagram showing a key testing device 3 in a second embodiment, and the sleeve 12 is shown from a section.

Referring to FIG. 3, the sleeve 12 of the key testing device 3 in this embodiment is same to that in FIG. 1, and the similar illustration is omitted herein. In this embodiment, the change of the loading unit 10 is illustrated with referring FIG. 1.

The loading unit 30 includes a block 300 and a rod 302. The block 300 includes a first magnetic component 300*a* which is used as the second fixing member. A first end 302*a* of the rod 302 includes a second magnetic component 302*c* which is used as the first fixing member. The attraction between the second magnetic component 302*c* and the first magnetic component 300*a* makes the block 300 detachably connected with the rod 302. In this embodiment, the first magnetic component 300*a* of the block 300 is disposed at the bottom of the block 300, which is not limited herein.

In another embodiment, the first magnetic component 300*a* is inserted in the bottom of the block 30 and aligns with the bottom surface of the block 300, and thus the block 300 has a smooth bottom surface to reduce wear of the magnetic component 300*a*.

Figure 4A:
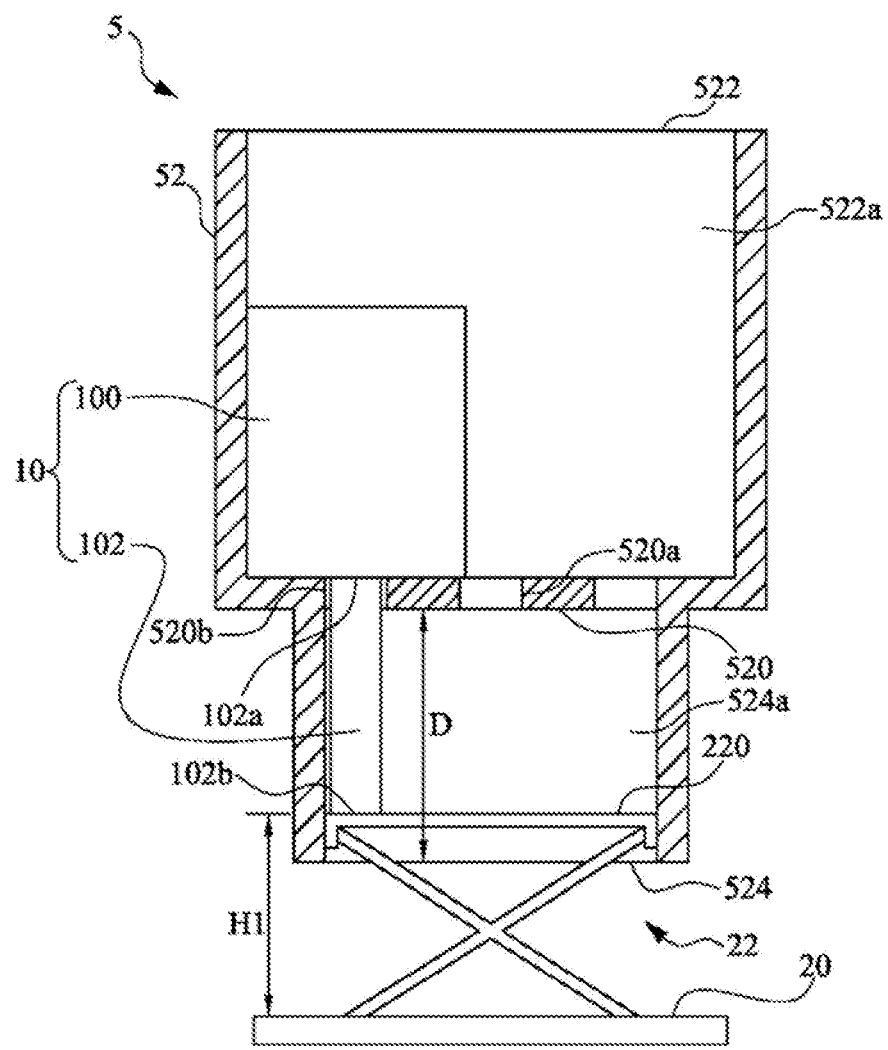
FIG. 4A is a exploded diagram showing a key testing device in a third embodiment before testing the key, wherein the sleeve is shown from a section.
Figure 4B:
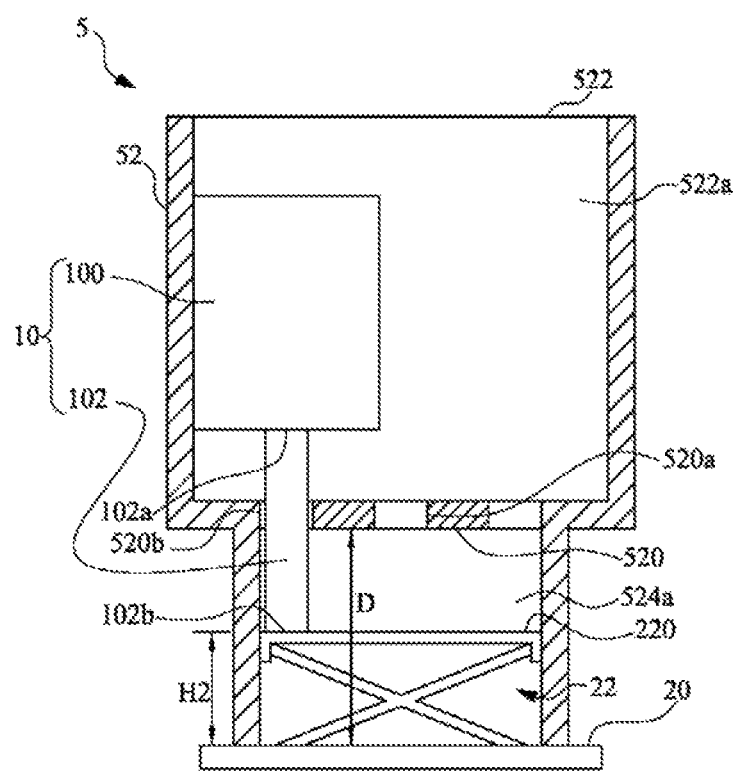
FIG. 4B is a schematic diagram showing the key testing device in FIG. 4A after testing the key.
Figure 5A:
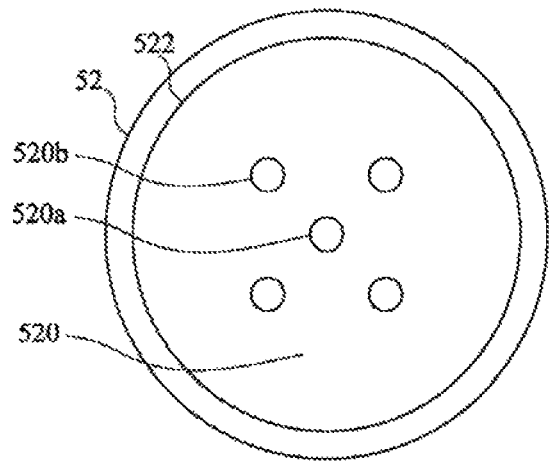
FIG. 5A is a top view of the sleeve in FIG. 4A.
Figure 5B:
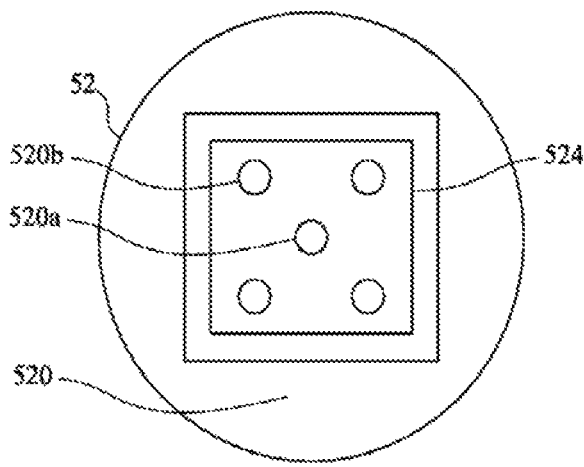
FIG. 5B is a bottom view of the sleeve in FIG. 4A.

FIG. 4A is an exploded diagram showing the key testing device 5 in a third embodiment before testing the key 22, and the sleeve is shown from a section. FIG. 4B is a schematic diagram showing the key testing device 5 in FIG. 4A after testing the key 22. FIG. 5A is a top view of the sleeve 52 in FIG. 4A. FIG. 5B is a bottom view of the sleeve 52 in FIG. 4A.

Referring to FIG. 4A to FIG. 5B, the loading unit 10 of the key testing device 5 is the same as in FIG. 1, which is omitted. In this embodiment, the change of the sleeve 12 is illustrated with referring to that in FIG. 1.

Referring to FIG. 4A and FIG. 4B, the sleeve 52 includes a first opening 522 and a second opening 524. The first opening 522 and the second opening 524 are formed at two ends of the sleeve 52 respectively. A partition plate 520 is disposed in the sleeve 52. A first accommodating space 522*a* is concavely formed at the sleeve 52 from the first opening 522 to the partition plate 520, and a second accommodating space 524*a* is concavely formed at the sleeve 52 from the second opening 524 to the partition plate 520. In other words, the partition plate 520 separates a first accommodating space 522*a* and a second accommodating space 524*a* in the sleeve 52.

The first accommodating space 522*a* of the sleeve 52 is used to accommodate the loading unit 10. The width of the second accommodating space 524*a* is larger than that of the keycap 220 to accommodate the key 22. When testing the key 22, the tester moves the key testing device 5 to the top of the key 22 and uses the second accommodating space 524*a* of the sleeve 52 to accommodate the key 22. The sleeve 52 stands at the baseplate 20 of the keyboard to reduce the burden of the tester.

Referring to FIG. 4A and FIG. 4B, the shape of the second accommodating space 524*a* matches with that of the key 22, and a clearance is formed between them. Consequently, when testing personnel makes the key 22 accommodated in the second accommodating space 524*a* of the sleeve 52, the second accommodating space 524*a* matches with the key 22 easily, and the position of the key 22 is limited in the second accommodating space 524*a* of the sleeve 52.

When the keycap 220 of the key 22 is quadrate shaped, the edge contour of the second accommodating space 524*a* of the sleeve 52 also may be quadrate as depicted in FIG. 5B, which is not limited herein.

When testing whether the structure of the key 22 is normal, the tester usually presses the center and the corner of the keycap 220 respectively, and the key testing device 5 in the embodiment can help this test, which is illustrated hereinafter.

The partition plate 520 of the sleeve 52 includes a plurality of through holes 520a and 520b. The rod 102 of the loading unit 10 passes through the through holes 520a and 520b and extends into the second accommodating space 524a. Furthermore, the through hole 520a of the partition plate 520 faces to the center of the keycap 220, and the through hole 520b is set corresponding to the corner of the keycap 220. The through hole 520b aligns with a point of a line between the center and the corner of the keycap 220, and it is much closer to the corner of the keycap 220. The distance between the through hole 520b and the corner of the keycap 220 is adjusted according to requirements. Consequently, when the second accommodating space 524a of the sleeve 52 accommodates the key 22 and the sleeve 52 is disposed on the baseplate 20, the through holes 520a and 520b of the partition plate 520 face to the center of the keycap 220 and the corner of the keycap 220 separately (referring to FIG. 4A to FIG. 5B).

As a result, the tester can selectively make the rod 102 of the loading unit 10 pass through the through hole 520a aligned to the keycap 220 or the through hole 520b corresponding to the corner of the keycap 220, and the tester presses down the keycap 220 with an accurate quantitative pressure (that is the gravity of the loading unit 10) on the center and the corner of the keycap 220.

Referring to FIG. 4A, to make the loading unit 10 press down the corner of the keycap 220 via the second end 102b of the rod 102, the width of the first accommodating space 522a is larger than that of the second accommodating space 524a to allow the loading unit 10 to move laterally in the first accommodating space 522a. Consequently, the rod 102 passes through the through holes 520a and 520b of the keycap 220.

To make the loading unit 10 successfully press down the keycap 220 via the second end 102b of the rod 102 when the sleeve 52 is put on the baseplate 20 and the second accommodating space 524a accommodates the key 22, the height D of the second accommodating space 524a (that is the depth of the sleeve 52 from the opening 524 to the partition plate 520) is larger than the height H1 of the impressed key 22, and smaller than the sum of the impressed height H1 and the length of the rod 102. As a result, before the key 22 is pressed, the sleeve 52 at the baseplate 20 would not press the keycap 220 via the partition plate 520, and the condition that the rod 102 of the loading unit 10 cannot contact the keycap 220 when the rod 102 passes through the through hole 520a and 520b is also avoided.

The height D of the second accommodating space 524a is smaller than the sum of the height H2 of the pressed key 22 and the length of the rod 102. Consequently, when the keycap 220 is pressed down completely, the gravity of the loading unit 10 is turned from the partition plate 520 to be applied on the keycap 220. In other words, the condition that the loading unit 10 is blocked by the partition plate 520 and cannot go further downwardly even when the keycap 220 is not pressed down completely is also avoided.

Figure 6:
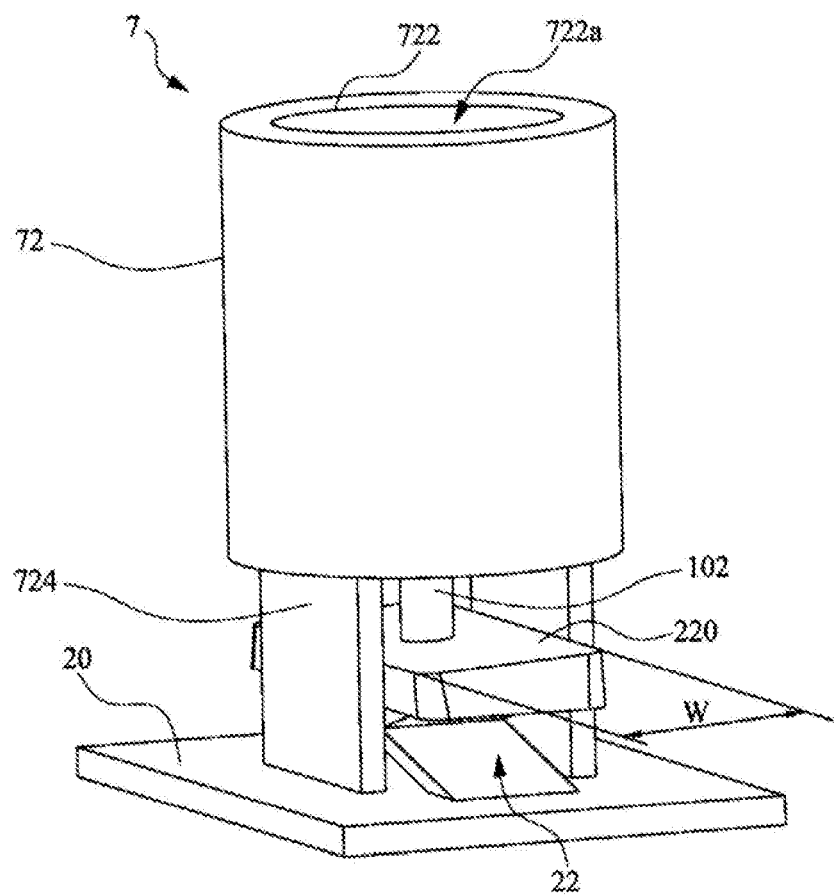
FIG. 6 is a three-dimensional schematic diagram showing that the key testing device tests the key in the fourth embodiment.

FIG. 6 is a three-dimensional schematic diagram showing that the key testing device 7 tests the key 22 in a fourth embodiment. In this embodiment, the change of the sleeve 52 is illustrated with referring FIG. 4.

Figure 7A:
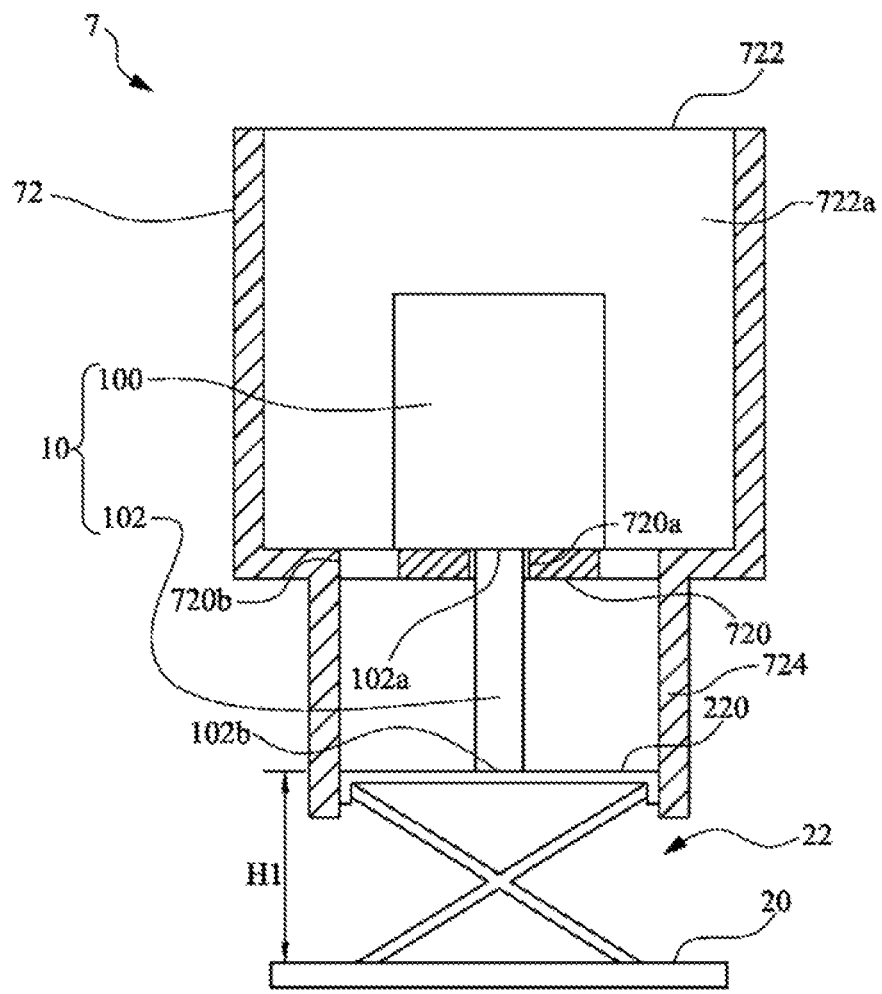
FIG. 7A is a schematic diagram showing the key testing device in FIG. 6 before testing the key, wherein the sleeve is shown from a section.

Referring to FIG. 6, the sleeve 72 of the key testing device 7 includes an opening 722 (corresponding to the first opening 522 in FIG. 4A) and an accommodating space 722a (corresponding to the first accommodating space 522a in FIG. 4A) concavely formed from the first opening 722 to the partition plate 720 (shown in FIG. 7A, and corresponding to the partition plate 520 in FIG. 4A).

The sleeve 72 further includes two supporting legs 724. The supporting legs 724 and the opening 722 are formed at two ends of the sleeve 72 respectively. The distance between two supporting legs 724 is larger than the width W of the keycap 220. And a slight gap is reserved between the supporting legs 724 and the key 22, and the supporting legs 724 limits the position of the key 22.

To test the key 22, testing personnel moves the key testing device 7 to the top of the key 22 and make the supporting legs 724 of the sleeve 72 cross two sides of the key 77. At the time, the sleeve 72 stands at the baseplate 20 of the keyboard via two supporting legs 724, and the burden of testing personnel is reduced.

In other words, the supporting legs 724 of the sleeve 72 has the function of standing and limiting the position of the key 22 similar to that of the second accommodating space 524a of the sleeve 52 in FIG. 4A. Moreover, the supporting legs 724 of the sleeve 72 also can be applied to the keys with the key cap 220 which is not square shaped. The key testing device 7 can test any key as long as that the supporting legs 724 of the sleeve 72 can be across the key.

Figure 7B:
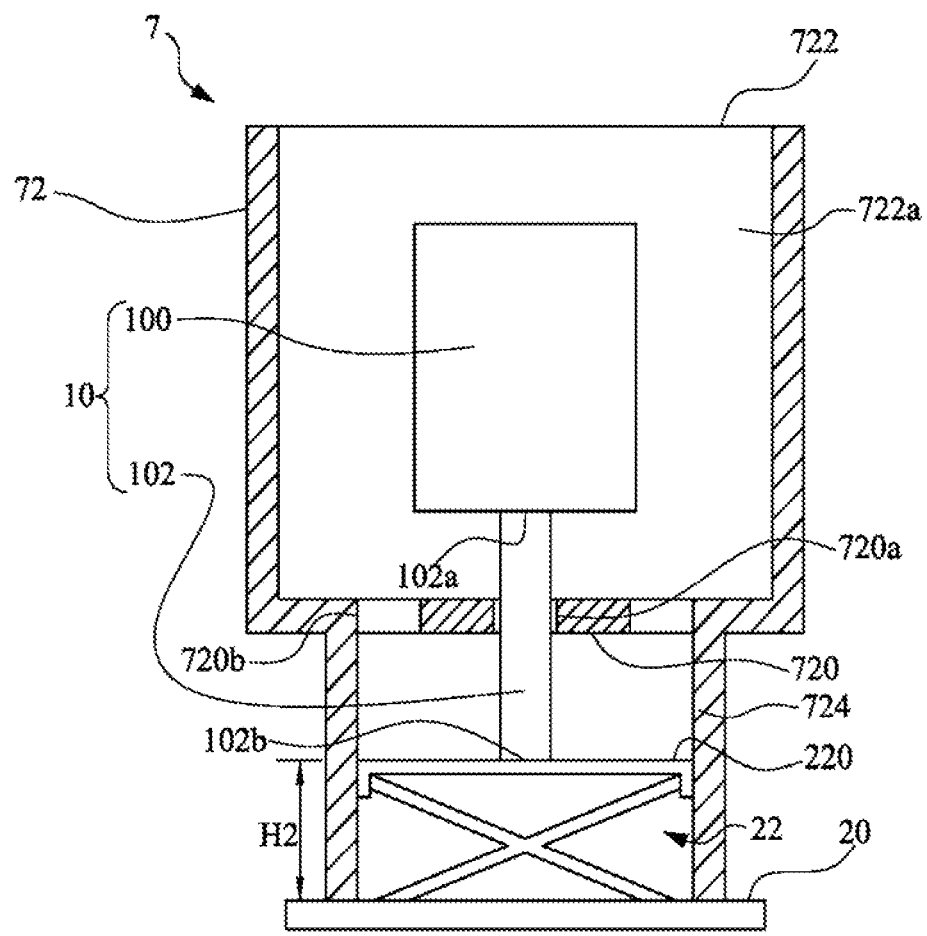
FIG. 7B is a schematic diagram showing the key testing device in FIG. 7A after testing the key.

FIG. 7A is a schematic diagram showing the key testing device 7 in FIG. 6 before testing the key and the sleeve 72 is shown from a section. FIG. 7B is a schematic diagram showing the key testing device 7 in FIG. 7A after testing the key 22.

To make the loading unit 10 successfully press down the keycap 220 via the second end 102b of the rod 102 when the sleeve 72 is put on the baseplate 20 and the supporting legs are across the key 22, the length of any of the supporting legs 724 is smaller than the height H1 of the unpressed key 22, and also smaller than the sum of the height H1 of the unpressed key 22 and the length of the rod 102. Consequently, before the key 22 is pressed, the sleeve 72 at the baseplate 20 would not press the keycap 220 via the partition plate 720, and the condition that the rod 102 of the loading unit 10 cannot contact the keycap 220 when the rod 102 passes through the through hole 720a, 720b is avoided.

Moreover, the length of the supporting legs 724 is larger than the sum of the height H2 of the unpressed key 22 and the length of the rod 102. When the keycap 220 is pressed completely, the whole gravity of the loading unit 10 is turned from the partition plate 720 to be applied on the keycap 220 (shown in FIG. 7B). In other words, the condition that the loading unit 10 is blocked by the partition plate 520 and cannot go further downwardly even when the keycap 220 is not pressed down completely is also avoided.

In sum, the key testing device in embodiments is simple, light and thin. After the loading unit is accommodated in the sleeve, the tester can hold the sleeve easily and move the key testing device quickly to the top of the key to be tested. In other words, the sleeve of the key testing device can be used as the carrier for moving the loading unit. Moreover, when the gravity of the loading unit is all applied on the keycap of the key, the sleeve makes the loading unit keep balanced at the keycap. Since the key testing device can make the pressure pressing on the key accurate via a loading unit, the probability of misjudgment is decreased.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A key testing device for detecting a key with a keycap, comprising:
    a loading unit, including:
        a block; and
        a rod including a first end and a second end, wherein the first end is detachably connected to the block; and
    a sleeve sleeved around the loading unit and having an axis, wherein the sleeve includes a partition plate, the partition plate includes a through hole for the second end to pass through, the partition plate bears the gravity of the loading unit, the loading unit freely slides in the sleeve relative to the partition plate along the axis, and the axis is perpendicular to the partition plate;
    wherein when the sleeve is above the key and after the second end contacts the keycap, the gravity of the loading unit is turned from the partition plate to be applied on the keycap,
    wherein the partition plate is used to separate a first accommodating space and a second accommodating space in the sleeve, the first accommodating space is used to accommodate the loading unit, the rod passes through the through hole and extends into the second accommodating space, and the second accommodating space is used to accommodate the key.

2. The key testing device according to claim 1, wherein a first fixing member is disposed at the first end of the rod, the block includes a second fixing member, the rod is connected to the block via locking, fastening, or magnetic connection between the first fixing member and the second fixing member.

3. The key testing device according to claim 1, wherein the height of the second accommodating space is larger than the height of the key when the key is not pressed.

4. The key testing device according to claim 1, wherein the height of the second accommodating space is smaller than sum of the height of the pressed key and the length of the rod.

5. The key testing device according to claim 1, wherein when the second accommodating space accommodates the key, the through hole is align with the center of the keycap.

6. The key testing device according to claim 1, wherein the width of the second accommodating space is larger than the width of the keycap.

* * * * *